United States Patent [19]

Field

[11] Patent Number: 4,539,801
[45] Date of Patent: Sep. 10, 1985

[54] RESILIENT FEED AUGER ATTACHMENT

[76] Inventor: Robert D. Field, P.O. Box 307, Jonesville, La. 71343

[21] Appl. No.: 595,325

[22] Filed: Mar. 30, 1984

[51] Int. Cl.³ ............................................ A01D 89/00
[52] U.S. Cl. ...................................... 56/364; 56/14.6; 198/613
[58] Field of Search ....................... 56/364, 12.4, 12.5, 56/14.5, 14.6; 198/494, 613, 692, 693, 723

[56] References Cited

U.S. PATENT DOCUMENTS

| 1,028,739 | 6/1912 | Kibat | 198/203 |
|---|---|---|---|
| 2,286,095 | 6/1942 | Innes | 56/364 |
| 2,476,265 | 7/1949 | Peterson | 56/158 |
| 2,490,143 | 12/1949 | Magee | 56/351 |
| 2,529,180 | 11/1950 | Oehler | 56/158 |
| 2,612,980 | 10/1952 | Oehler | 198/513 |
| 2,633,231 | 3/1953 | Pilcher | 198/693 |
| 2,644,292 | 7/1953 | Oberholtz | 56/364 |
| 2,700,865 | 2/1955 | Russell | 56/364 |
| 2,701,634 | 2/1955 | Carroll | 130/22 A |
| 2,748,921 | 6/1956 | White | 198/518 |
| 2,778,483 | 1/1957 | Nikkel | 198/494 |
| 2,803,505 | 8/1957 | Oberholtz | 56/364 |
| 2,832,187 | 4/1958 | Johnson | 56/14.5 |
| 3,142,375 | 7/1964 | Luke | 198/613 |
| 3,226,921 | 1/1966 | Shepley | 56/341 |
| 3,411,615 | 11/1960 | Schwahn | 56/364 |
| 3,926,108 | 12/1975 | Doering | 56/364 |
| 4,217,672 | 8/1980 | Olivari | 56/364 |
| 4,266,560 | 5/1981 | Powell et al. | 56/14.6 |
| 4,271,956 | 6/1981 | Hutchinson et al. | 198/613 |
| 4,290,259 | 9/1981 | Parvin et al. | 56/364 |
| 4,313,449 | 2/1982 | Da Silva | 56/14.6 |
| 4,453,375 | 6/1984 | Field | 56/364 |
| 4,484,684 | 11/1984 | Tetreault | 198/613 |

FOREIGN PATENT DOCUMENTS 2818343 11/1979 Fed. Rep. of Germany ........ 56/364

Primary Examiner—Robert Peshock
Assistant Examiner—David I. Tarnoff
Attorney, Agent, or Firm—Roylance, Abrams, Berdo & Goodman

[57] ABSTRACT

Resilient attachments are mounted on a feed auger of the type having a central drum mounted for rotation about a longitudinal axis, spiral flights mounted on longitudinal ends of the drum, and a central drum portion having a plurality of radially extending feed fingers. Each resilient attachment is mounted on and extends radially from the central drum portion about one of the fingers. During operation of the auger, the attachment prevents the accumulation of vegetation on the auger, improves feeding of the vegetation to the combine throat and protects the auger from damage.

22 Claims, 11 Drawing Figures

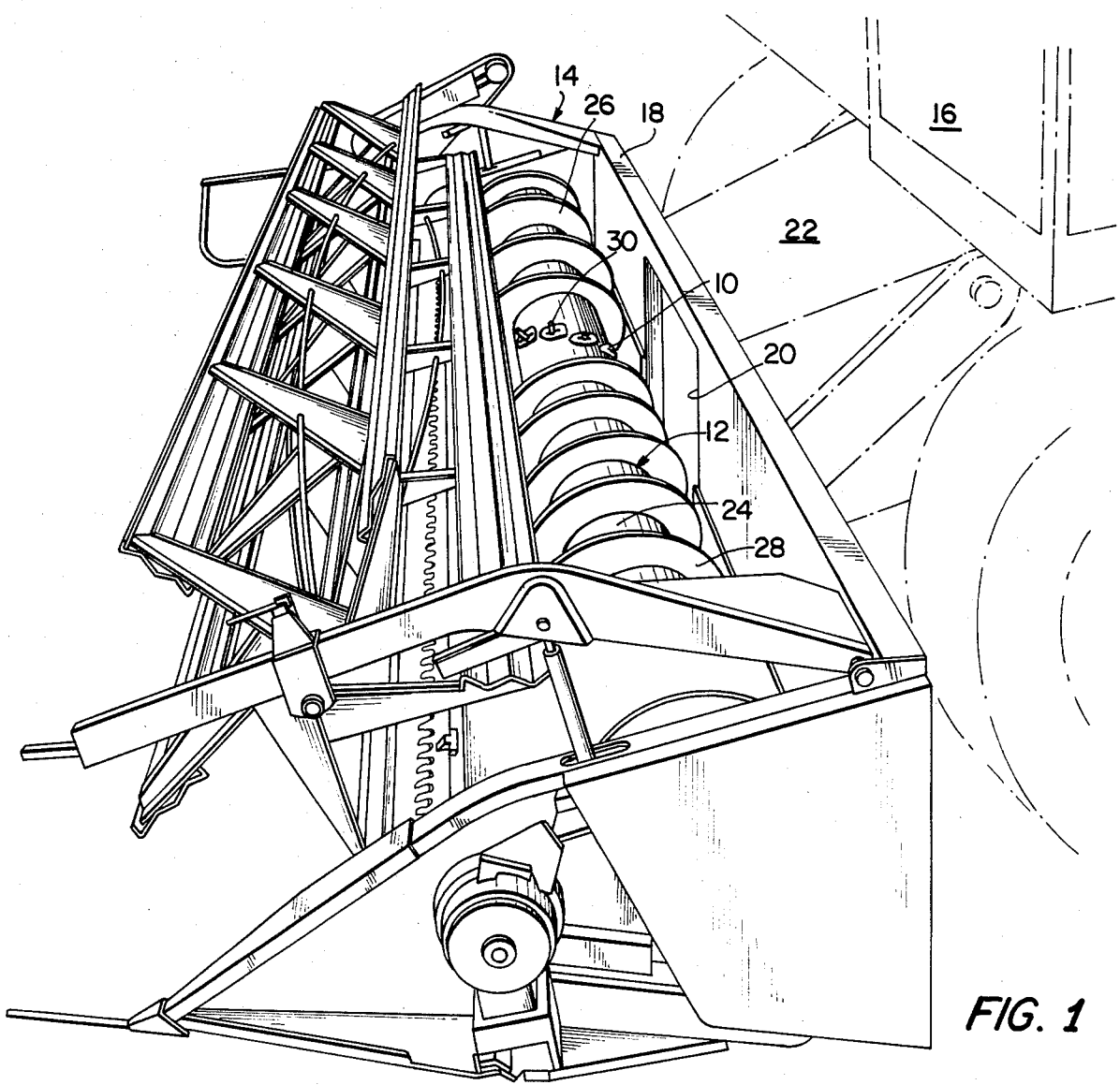
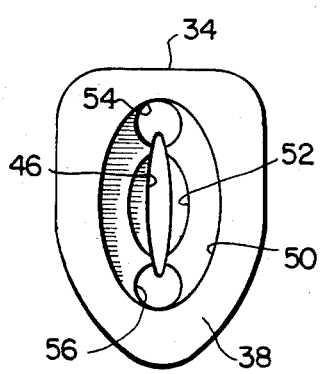
FIG. 4
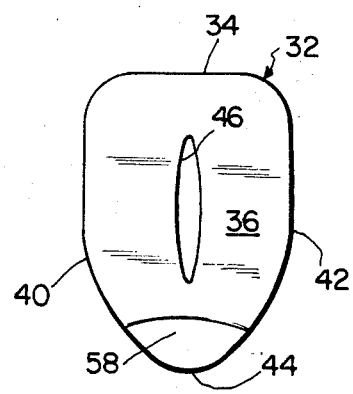
FIG. 5
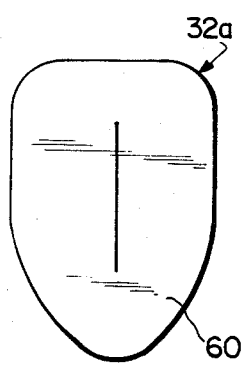
FIG. 8

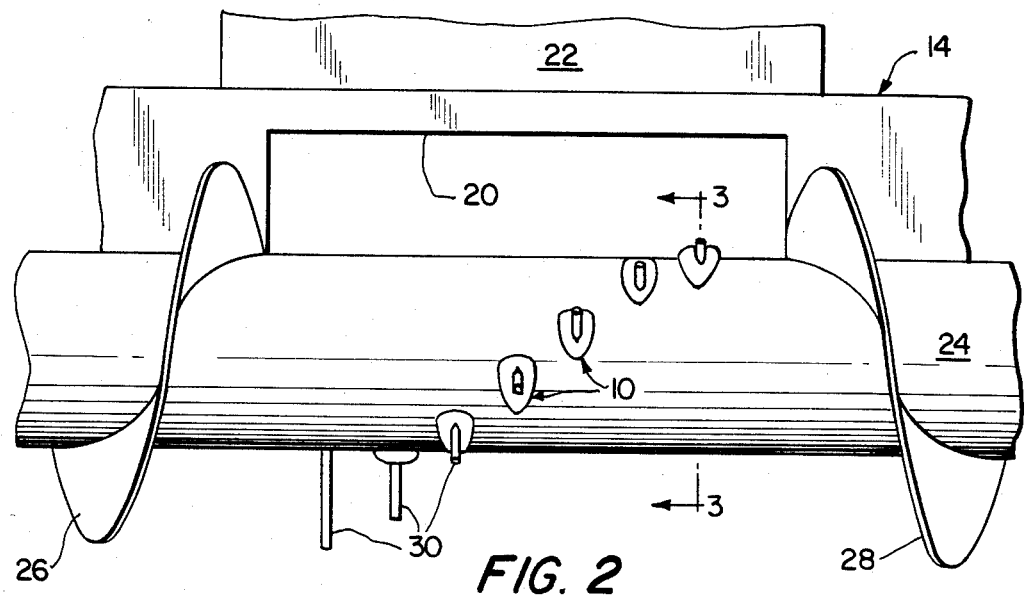
FIG. 2
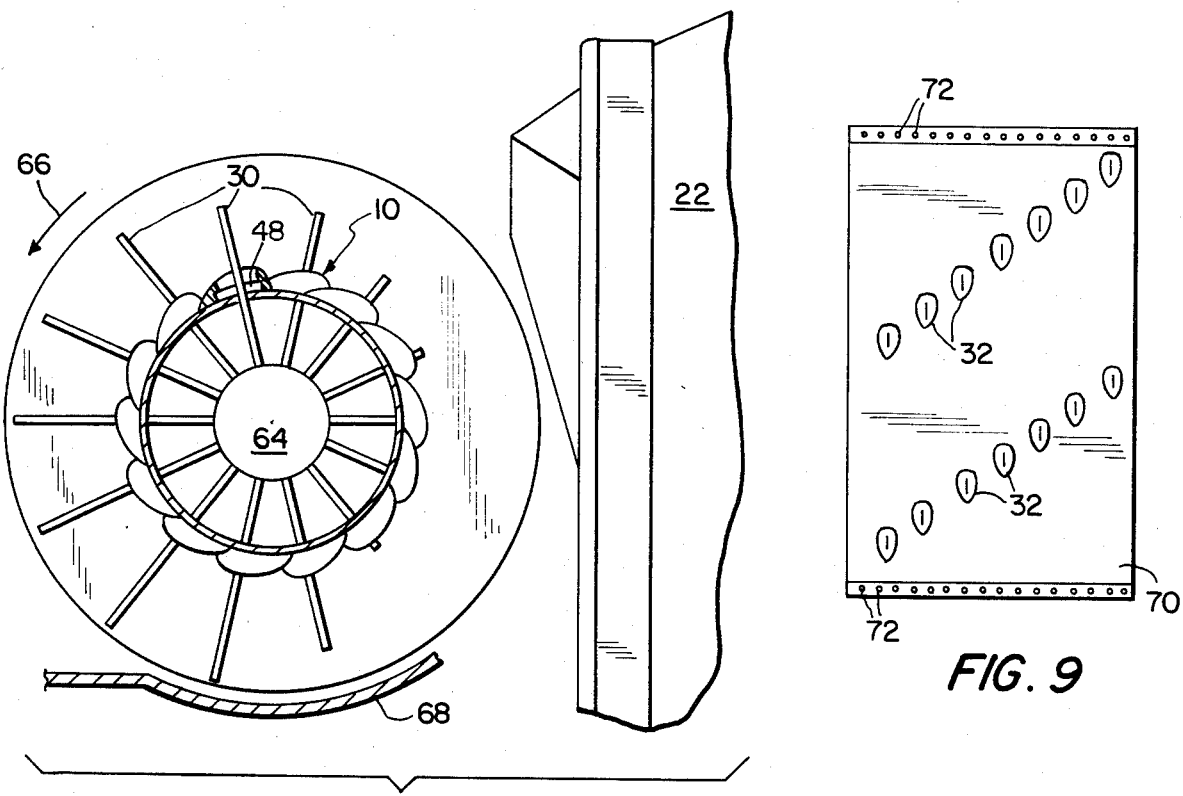
FIG. 3
FIG. 9

RESILIENT FEED AUGER ATTACHMENT

CROSS-REFERENCE TO RELATED APPLICATION

The present application is related to Applicant's prior application entitled Feed Auger Attachment, Ser. No. 449,559, filed Dec. 13, 1982, now U.S. Pat. No. 4,453,375, the subject matter of which is hereby incorporated by reference.

BACKGROUND OF THE INVENTION

1. Field of the Invention

The present invention relates to an attachment for a feed auger in a combine header or the like. More particularly, the invention relates to a plurality of discrete and separate resilient attachments which are mounted on and extend radially from the central drum portion of a feed auger about its fingers and between its spiral flights.

2. Description of the Prior Art

Conventional feed augers for combine headers comprise a cylindrical drum mounted at its ends to a header for rotation about the longitudinal axis of the drum. Spiral flights are mounted on the drum adjacent its opposite ends for conveying material toward the central drum. A plurality of feed fingers are mounted in the drum and extend radially from the central drum portion for conveying vegetation toward the throat of the combine header. The fingers reciprocate radially in and out of the drum as the drum rotates. Typical examples of such augers are disclosed in U.S. Pat. No. 2,701,634 to Carroll and U.S. Pat. No. 2,748,921 to White.

A principal problem in conventional feed augers is the accumulation of vegetation on the central drum portion of the auger. During use, the accumulation of vegetation tends to clog the auger requiring the operator to shut down the combine and manually remove the vegetation from the auger central drum portion. Attempts to prevent the accumulation of vegetation on the central drum portion of the auger have involved cutting or stripping the vegetation from the fingers. Typical devices for stripping or cutting the vegetation are disclosed in U.S. Pat. No. 2,778,483 to Nikkel and U.S. Pat. No. 4,270,259 to Parvin et al.

During use, augers are typically bent in the central drum portion immediately adjacent the fingers. At these locations, the augers have weak points. Bending of the auger inwardly prevents the fingers from retracting to a sufficient extent within the central drum portion to prevent the accumulation of vegetation and wraparound. To fix such bends in the auger central portion, the fingers and their bearings are removed, as well as the access doors on the auger, such that a hammer can be inserted within the auger to pound the dents outwardly. Such conventional repair procedure is both difficult and time consuming.

Additionally, augers presently on the market are arranged so that the fingers do not completely retract into the auger. This leaves at least a small portion of the fingers projecting from the auger at all times increasing the problem of vegetation accumulation and wraparound.

SUMMARY OF THE INVENTION

Accordingly, an object of the present invention is to provide a feed auger and an attachment for a feed auger which will prevent the accumulation of vegetation on a central drum portion of an auger.

Another object of the present invention is to provide a feed auger and an attachment for a feed auger which is simple and inexpensive to manufacture and mount on a feed auger, which is of rugged construction and which will enhance the operation of the feed auger.

The foregoing objects are obtained by providing a feed auger for a combine and the like comprising a generally cylindrical drum mounted for rotation about a longitudinal axis with spiral flights mounted on the drum adjacent the longitudinal ends of the drum and a central drum portion between the flights. A plurality of discrete, resilient attachments are mounted on and extend radially from the central drum portion.

The foregoing objects are also obtained by a resilient attachment for a feed auger of the type having a cylindrical drum mounted for rotation about a longitudinal axis, spiral flights mounted on opposite longitudinal ends of the drum, and a central drum portion having a plurality of feed fingers extending radially from the central drum portion. The attachment includes a body member of resilient material, an opening extending through the body member for receiving one of the fingers, and a coupling for attaching the body member about the central drum portion.

The foregoing objects are further obtained by a resilient attachment for a feed auger of the type having a central drum mounted for rotation about a longitudinal axis, spiral flights mounted on opposite longitudinal ends of the drum, and a central drum portion between the spiral flights. The attachment includes a sheet member, a plurality of body members of resilient material mounted on the sheet member, and couplings mounted at opposite ends of the sheet member for attaching the sheet member about the central drum portion.

A feed auger with the resilient attachments of the present invention on its central drum portion essentially eliminates the problems previously experienced with conventional feed augers. The attachments will prevent damage to the feed augers and enhance feeding of the vegetation. With feed augers having radially extending fingers, the resilient attachments prevent the accumulation of vegetation by the relative wiping action between the feed fingers and the attachments.

Other objects, advantages and salient features of the present invention will become apparent from the following detailed description, which taken in conjunction with the annexed drawings, discloses preferred embodiments of the invention.

BRIEF DESCRIPTION OF THE DRAWINGS

Referring to the drawings which form a part of this disclosure:

FIG. 1 is a perspective view illustrating a combine header with a feed auger and attachments in accordance with the present invention;

FIG. 2 is a partial, enlarged, front elevational view of the auger and attachments of FIG. 1;

FIG. 3 is a partial, side elevational view in section taken along lines 3—3 of FIG. 2;

FIG. 4 is a bottom plan view of one of the attachments of FIG. 1;

FIG. 5 is a top plan view of one of the attachments of FIG. 1;

FIG. 8 is a top plan view of another embodiment of an attachment in accordance with the present invention;

FIG. 9 is a top plan view of a further embodiment of the attachment in accordance with the present invention;

DETAILED DESCRIPTION OF THE PREFERRED EMBODIMENTS OF THE INVENTION

Figure 6:
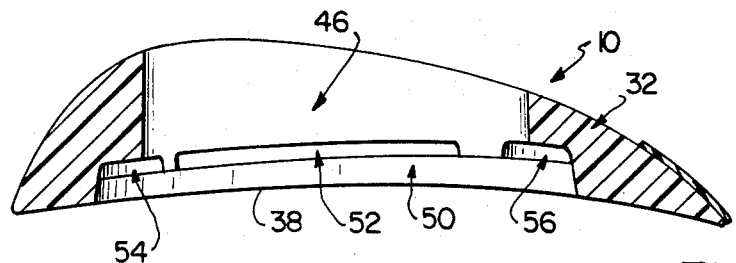
FIG. 6 is a side elevational view in section of one of the attachments of FIG. 1.
Figure 7:
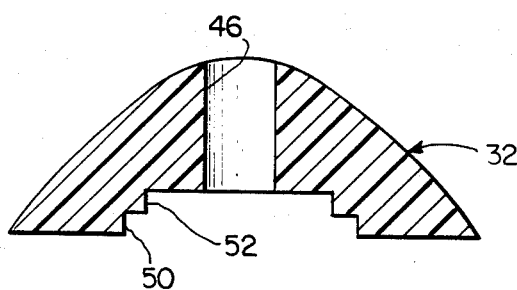
FIG. 7 is a front elevational view in section of one of the attachments of FIG. 1.

Referring initially to FIG. 1, the resilient attachments 10 formed according to the present invention are mounted on a feed auger 12 of a combine header 14. Combine header 14 is coupled onto the front of a combine 16, illustrated in phantom lines. The rear wall 18 of header 14 includes a feed passageway or throat 20 which communicates with combine throat 22.

Feed auger 12 is located forward of rear wall 18 and is mounted in the header for rotation about a longitudinal axis extending parallel to the rear wall 18 and perpendicular to combine throat 22. The auger comprises a generally cylindrical drum 24 having first and second spiral flights 26,28 mounted adjacent the longitudinal ends of the drum. The flights, upon rotation of the drum, convey vegetation toward the longitudinal center of the auger which is known as the central drum portion. A plurality of feed fingers 30 are mounted in the drum and extend radially from the central drum portion between the spiral flights. Attachments 10 are mounted on this central drum portion about each of the individual fingers 30.

Referring to the details of the invention illustrated in FIGS. 2-7, each attachment 10 comprises a unitary body member 32 formed of any suitable resilient material. For example, the body member can comprise foam rubber. Alternatively, body member 32 can be in the form of an air cushion comprising two rubber sheets defining an inflatable air cell therebetween, or can be formed in separate parts such as parallel strips.

Each body member 32 has an inner configuration generally in the form of a truncated semi-ovoid or a semi-ovoid with a flat end 34. The outer or top surface 36 is convex, while the inner or bottom surface 38 is concave with a constant radius of curvature defining a portion of a cylinder. As depicted in FIGS. 4 and 5, the body member, in plan view, has a navicular or arrowhead shape with a flat end 34, curved sides 40 and 42, and a generally pointed front end 44. Outer surface 36 and inner surface 38 define a body member which tapers toward its lateral edges. Typically, the body member is about six inches long, has a maximum width of about four inches and has a maximum thickness of about 1.5 inches.

Inner surface 38 is curved in the longitudinal direction of body member 32. This curvature corresponds to the cylindrical surface of the auger central drum portion to facilitate coupling of the attachment to the auger.

An elongated slot 46 is centrally located within body member 32 and extends through the body member and along its longitudinal axis. Extending laterally outwardly from slot 46, inner surface 38 is recessed for receiving the finger guide 48 normally provided about each finger 30 on the central drum portion. Specifically, a relatively large, outer recess 50 and a relatively small inner recess 52 are provided. Each of these recesses are generally oval in plan view and are generally oriented along the same axis extending in a radial direction of the auger. Additionally, end recesses 54 and 56 are provided above recess 50 and laterally adjacent recess 52 for receiving the exposed ends of the bolts coupling finger guide 48 to the auger. Since slot 46 extends into end recesses 54 and 56, slot 46 provides access to the finger guide and to the bolts attaching it to the auger to permit maintenance on the fingers without removal of attachments 10 from the auger.

A protective cover 58 is provided on outer surface 36 adjacent front end 44. This cover can comprise a thin, reinforced piece of cloth suitably attached to the body member to protect that portion of the body member normally subjected to the greatest wear.

In the alternative embodiment illustrated in FIG. 8, a protective cover 60 is provided over the entire outer surface of the body member 32a. Cover 60 has an elongated slit 62 oriented coaxially relative to the elongated slot formed in the body member. This arrangement provides a further wiping action on the fingers and added protection against the accumulation of vegetation on the parts of the auger adjacent the fingers.

The attachment 10 can be coupled to the auger by adhesive or other suitable means. For example, screws can be threaded in the auger and recessed within the body member so that they are not exposed. The bolts holding the finger guides can also be arranged to secure the attachment to the auger.

When securing attachment 10 to the auger by adhesive, the adhesive should only be applied to the portion of inner surface 38 extending laterally outwardly of recess 50. In this manner, the attachment will not be adhered to the finger guide permitting removal of the finger guide for maintenance, without removal of the attachment.

Feed fingers 30 are coupled within drum 24 to a reciprocating mechanism 64 of conventional design. Mechanism 64 causes the fingers to reciprocate in a radial direction between radially extended positions and radially retracted positions as auger 12 rotates. Since the thickness of each attachment 10 in a radial direction is significantly greater than the extension of the fingers in their retracted positions, the fingers completely retract through the thickness of attachments 10.

In operation, attachments 10 rotate simultaneously with auger 12. As the auger rotates in the direction indicated by arrow 66, vegetation is fed directly to or indirectly by the spiral flights 26 and 28 to the central drum portion of auger 12. The vegetation is then engaged by fingers 30 between auger 12 and bottom wall 68 of header 14 to be forced into feed throat 20.

Resilient attachments 10 prevent the accumulation of vegetation on auger 12 by the wiping action with fingers 30 and by covering projections extending from the central drum portion which tend to accumulate vegetation. Since fingers 30 retract completely through the attachments, as illustrated in FIG. 3, all vegetation adhering to a retracting finger is forced off the finger and directed toward throat 20. Since the projections on the central drum portion mounting the fingers are covered by the attachments, no vegetation can adhere to such projections. The resilient attachments will readily conform to the auger even when the auger is bent. Thus, the fingers will completely retract within the attachments to be completely cleaned even with bending of the auger. Accordingly, the present invention eliminates a substantial portion of the maintenance normally required for conventional augers.

Resilient attachment 10 readily deforms under the presence of heavy loads. Thus, the attachment will not interfere with the feeding of heavy loads of vegetation and grain entering the machine. On the contrary, the attachments tend to provide a more even flow of grain into the combine throat. This is particularly true with light loads such that a smoother and more continuous flow of material passes into the combine throat. Additionally, the attachments present a vegetation engaging surface with a greater coefficient of friction, than the auger drum, to more positively contact and feed the vegetation.

With resilient attachments 10 secured to the auger central drum portion at their outer edges, forces directed radially inwardly on the attachments cause slots 46 to close more tightly about the fingers extending therethrough. The greater the force on the attachment, the greater the closing of slot 46. The closing of slot 46 further prevents vegetation from passing between the finger and the slot and becoming trapped therebetween.

Once the pressure is relieved from the resilient attachment, the attachment will resume its relaxed state forcing the vegetation from the finger and toward the combine throat. This further enhances the flow of the vegetation in the combine.

The elongation of the slot also permits the finger to extend in a variety of different angles. The different angular extension of the finger may result from reversing of the auger.

The attachment can be used on other types of augers. For example, it can be used on a feeder beater which is located behind the main feed auger in the throat of certain combines, for example, the GLEANER distributed by Allis Chalmers.

To facilitate mounting of the attachments, a plurality of body members 32 can be located on a single sheet 70 of material as illustrated in FIG. 9. Such sheet can be rubber or vinyl coated nylon, and can be coupled about the auger central portion by suitable snaps 72 or a Velcro type fastener.

Figure 10:
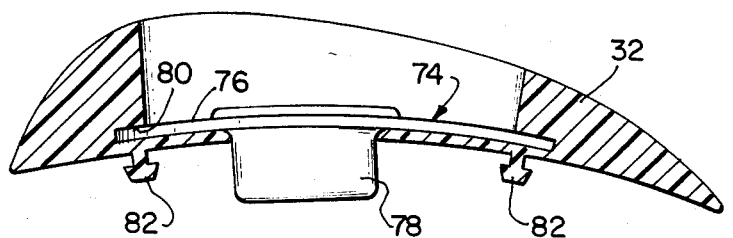
FIG. 10 is a side elevational view in section of still another embodiment of an attachment in accordance with the present invention.

As illustrated in FIG. 10, the attachment can be molded about a standard feed auger bushing 74 comprising a metal plate 76 and a resilient bearing 78. In this manner, bushing 74 becomes an integral part of the attachment and is positively retained in an internal cavity 80 formed in body member 32. Integral snaps 82 depend from body member 32 for coupling the attachment in the openings in feed auger central drum portion conventionally provided for attaching the bushing. Alternatively, bolts can be used in place of snaps 82.

Figure 11:
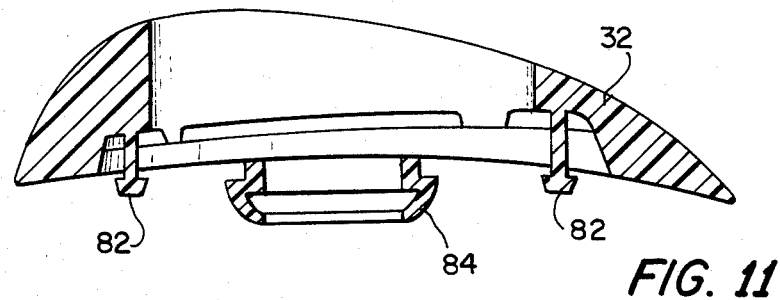
FIG. 11 is a side elevational view in section of a still further embodiment of an attachment in accordance with the present invention.

An alternative snap arrangement for coupling the resilient attachment to a feed auger is illustrated in FIG. 11. In addition to snaps 82, body member 32 has a unitary, depending bushing 84. This arrangement eliminates the need for bushing 74. If the transverse cross-sectional configurations of bushing 84 and the mating opening in the feed auger are non-circular (e.g., rectangular), snaps 82 can be eliminated since bushing 84 will both retain and prevent rotation of the attachment.

Although the invention has been described in considerable detail with particular reference to certain preferred embodiments thereof, variations and modification can be effected within the spirit and scope of the invention as defined in the appended claims.

What is claimed is:

1. A feed auger for a combine header and the like, comprising:
   a generally cylindrical drum with means for mounting said drum for rotation about a longitudinal axis;
   first and second spiral flights mounted on said drum adjacent longitudinal ends thereof;
   a central drum portion between said flights;
   a plurality of feed fingers coupled to said drum and extending radially from said central drum portion;
   reciprocating means, coupled to said feed fingers and located within said drum, for moving said fingers between radially extended and radially retracted positions as said drum rotates; and
   a plurality of discrete, resilient attachment means mounted on and extending radially from said central drum portion, each of said resilient attachment means having an opening receiving one of said feed fingers, said resilient attachment means being sized and shaped for compressing against vegetation in a relatively narrow space formed between said drum and said header, for expanding and pushing against vegetation in a wider space formed between said drum and a combine throat, for providing increased frictional surface areas, for varying said central drum portion to accommodate different sized loads, for protecting and repairing said central drum portion and for removing vegetation from said feed fingers.

2. A feed auger according to claim 1 wherein each of said resilient attachment means has a radial thickness greater than the extension of said fingers from said central drum portion in said retracted positions, such that said fingers completely retract through said resilient attachment means.

3. A feed auger according to claim 1 wherein said openings comprise slots extending generally transversely of said longitudinal axis.

4. A feed auger according to claim 1 wherein said resilient attachment means are formed of foam rubber.

5. A feed auger according to claim 1 wherein said resilient attachment means are individually attached to said central drum portion.

6. A feed auger according to claim 5 wherein said resilient attachment means are attached by adhesive to said central drum portion.

7. A feed auger according to claim 5 wherein said resilient attachment means are bolted to said central drum portion.

8. A feed auger according to claim 5 wherein said resilient means comprise integral, resilient snap means for attaching said resilient means to openings in said central drum portion.

9. A feed auger according to claim 5 wherein said resilient means comprise internal cavities positively retaining feed auger bushings therein.

10. A feed auger according to claim 1 wherein said resilient means comprise unitary bushings.

11. A feed auger according to claim 1 wherein each of said resilient attachment means has a relatively thick central portion and tapers radially outwardly to an outer edge.

12. A resilient attachment for a feed auger in a combine header of the type having a cylindrical drum mounted for rotation about a longitudinal axis, spiral flights mounted on opposite longitudinal ends of the drum, and a central drum portion having a plurality of reciprocating feed fingers extending radially therefrom, the attachment comprising:

a body member of resilient material, said body member being sized and shaped for compressing against vegetation in a relatively narrow space formed between said drum and said header, for expanding and pushing against vegetation in a wider space formed between said drum and a combine throat, for providing increased frictional surface areas, for varying the central drum portion to accommodate different sized loads, for protecting and repairing the central drum portion and for removing vegetation from the feed fingers; an opening extending through said body member for receiving one of the feed fingers; and coupling means for attaching said body member about the central drum portion.

13. A resilient attachment according to claim 12 wherein said opening comprises an elongated slot.

14. A resilient attachment according to claim 12 wherein said body member tapers toward lateral edges thereof.

15. A resilient attachment according to claim 12 wherein said body member is formed of foam rubber.

16. A resilient attachment according to claim 12 wherein said body member has an outer cover.

17. A resilient attachment according to claim 12 wherein said coupling means comprises resilient snaps means, integrally formed on said body member, for attaching said body member to openings in the central drum portion.

18. A resilient attachment according to claim 12 wherein said body member comprises an internal cavity positively retaining a feed auger bushing therein.

19. A resilient attachment according to claim 12 wherein said body member comprises a unitary bushing.

20. A feed auger according to claim 7 wherein bolts attaching each of said resilient attachment means to said central drum portion are covered by the respective resilient attachment means, preventing the accumulation of vegetation on said bolts.

21. A feed auger according to claim 11 wherein each of said resilient means comprises a convex outer surface and a concave inner surface with a substantially constant radius of curvature defining a portion of a cylinder.

22. A resilient attachment according to claim 14 wherein said body member comprises a convex outer surface and a concave inner surface with a substantially constant radius of curvature defining a portion of a cylinder.

* * * * *